US011872800B2

(12) United States Patent
Ohashi

(10) Patent No.: US 11,872,800 B2
(45) Date of Patent: Jan. 16, 2024

(54) PRINTING APPARATUS

(71) Applicant: Seiko Epson Corporation, Tokyo (JP)

(72) Inventor: Fusao Ohashi, Shiojiri (JP)

(73) Assignee: Seiko Epson Corporation, Tokyo (JP)

( * ) Notice: Subject to any disclaimer, the term of this patent is extended or adjusted under 35 U.S.C. 154(b) by 251 days.

(21) Appl. No.: 17/528,973

(22) Filed: Nov. 17, 2021

(65) Prior Publication Data

US 2022/0161545 A1 May 26, 2022

(30) Foreign Application Priority Data

Nov. 20, 2020 (JP) ................................ 2020-193326

(51) Int. Cl.
*B41J 29/02* (2006.01)
*B41F 15/34* (2006.01)
*B41F 15/18* (2006.01)
*E21B 43/10* (2006.01)

(52) U.S. Cl.
CPC ............. *B41F 15/34* (2013.01); *B41F 15/18* (2013.01); *E21B 43/106* (2013.01)

(58) Field of Classification Search
CPC ... B41J 29/00; B41J 29/02; B41J 29/08; B41J 29/13; B41J 29/12; B41J 29/16; B41J 11/001
See application file for complete search history.

(56) References Cited

FOREIGN PATENT DOCUMENTS

| | | | | |
|---|---|---|---|---|
| CN | 201501167 | U | * | 6/2010 |
| EP | 0646470 | A2 | * | 4/1995 |
| JP | 2013-018150 | | | 1/2013 |
| JP | 2020054852 | A | * | 4/2020 |

OTHER PUBLICATIONS

Aoyagi, MachineTranslationofJP-2020054852-A, 2020 (Year: 2020).*
Luo, MachineTranslationofCN-201501167-U, 2010 (Year: 2010).*
Mineishi, MachinetranslationofEP-0646470-A2, 1995 (Year: 1995).*

* cited by examiner

*Primary Examiner* — Scott A Richmond
(74) *Attorney, Agent, or Firm* — WORKMAN NYDEGGER

(57) ABSTRACT

A printing apparatus includes a base frame being bridged between a pair of legs and being configured to support a printing unit, and a board box being arranged under the base frame and being configured to accommodate a control board. A hook is provided to any one surface of a lower surface of the base frame and an upper surface of the board box, and a hole engageable with the hook is provided in the other surface. A female screw is formed in any one side surface of a side surface of the base frame and a side surface of the board box, and a fixing member configured to abut against the one side surface is provided to the other side surface. The board box is fixed to the base frame by a male screw screwed into the female screw through intermediation of the fixing member.

8 Claims, 5 Drawing Sheets

PRINTING APPARATUS

The present application is based on, and claims priority from JP Application Serial Number 2020-193326, filed Nov. 20, 2020, the disclosure of which is hereby incorporated by reference herein in its entirety.

BACKGROUND

1. Technical Field

The present disclosure relates to a printing apparatus.

2. Related Art

Hitherto, there has been known a printing apparatus that discharges ink onto a medium supported on a support face heated by a heater and prints an image and the like. For example, JP-A-2013-18150 discloses a printing apparatus in which a control board that controls a heater is provided inside an after-heater unit that heats a medium after printing.

The printing apparatus described in JP-A-2013-18150 has difficulties in mounting and removing the control board. For example, when maintenance is required for the control board, the after-heater unit needs to be disassembled.

SUMMARY

A printing apparatus includes: a base frame bridged between a pair of legs that are separated away from each other in a first direction and configured to support a printing unit configured to perform printing on a medium; and a board box arranged under the base frame and configured to accommodate a control board. A hook is provided to any one surface of a lower surface of the base frame and an upper surface of the board box, and a hole engageable with the hook is provided in the other surface. A female screw is formed in any one side surface of a side surface of the base frame and a side surface of the board box, and a fixing member configured to abut against the one side surface is provided to the other side surface. The board box is fixed to the base frame by a male screw screwed into the female screw through the fixing member.

DESCRIPTION OF EXEMPLARY EMBODIMENTS

1. Exemplary Embodiment

Figure 1:
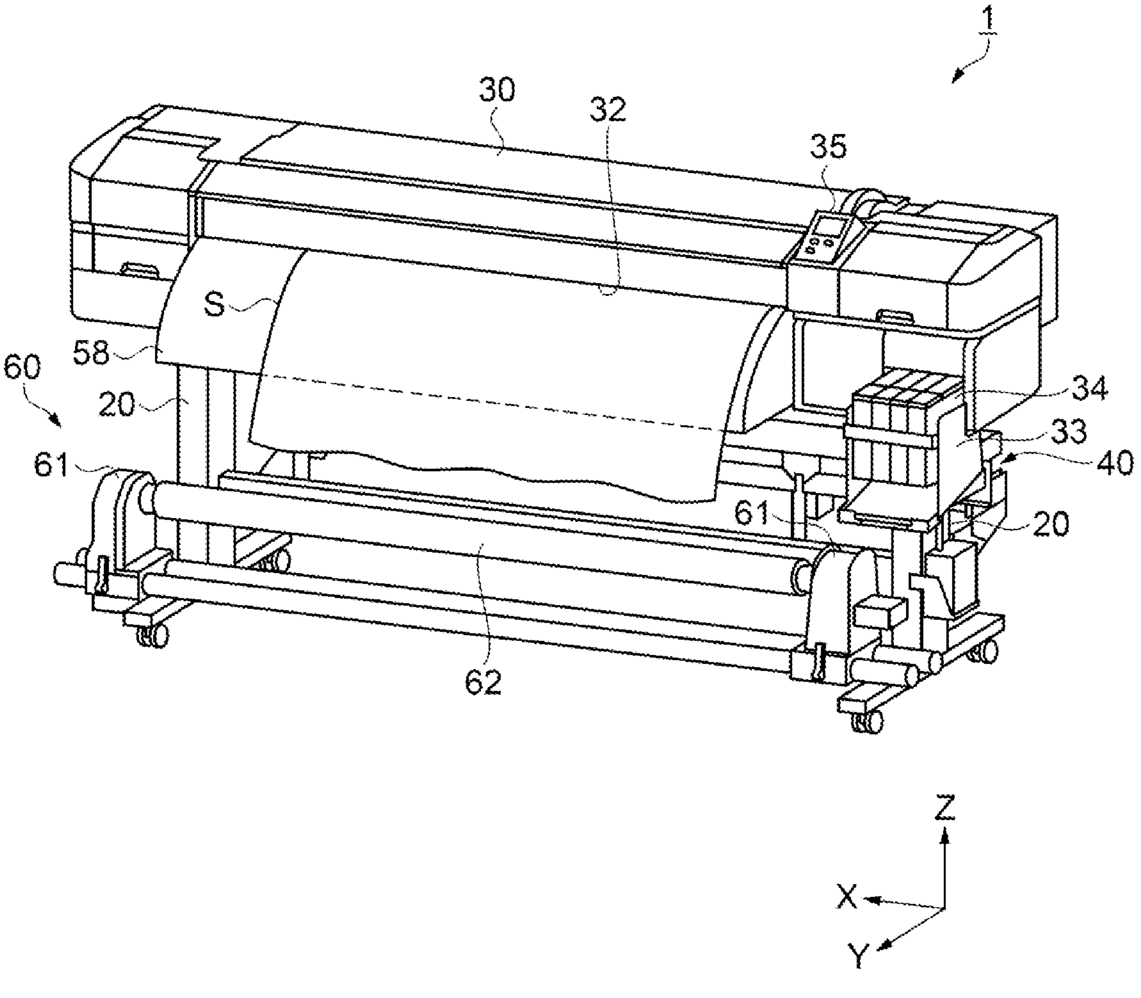
FIG. 1 is a perspective view illustrating a configuration of a printing apparatus according to an exemplary embodiment.

A schematic configuration of a printing apparatus 1 according to an exemplary embodiment is described. Note that, in the coordinates denoted in the drawings, both directions along a Z-axis extend in an up-and-down direction while the arrow direction indicates “up”, both directions along a X-axis extend in a right-and-left direction while the arrow direction indicates “left”, and both directions along a Y-axis extend in an front-and-back direction while the arrow direction indicates “front”. Further, both the directions along the X-axis correspond to a main scanning direction, and the Y-axis corresponds to a transport direction in a printing unit 70. Further, the positional relationship along the transport direction of a medium S is also referred to as “upstream” or “downstream”.

Figure 2:
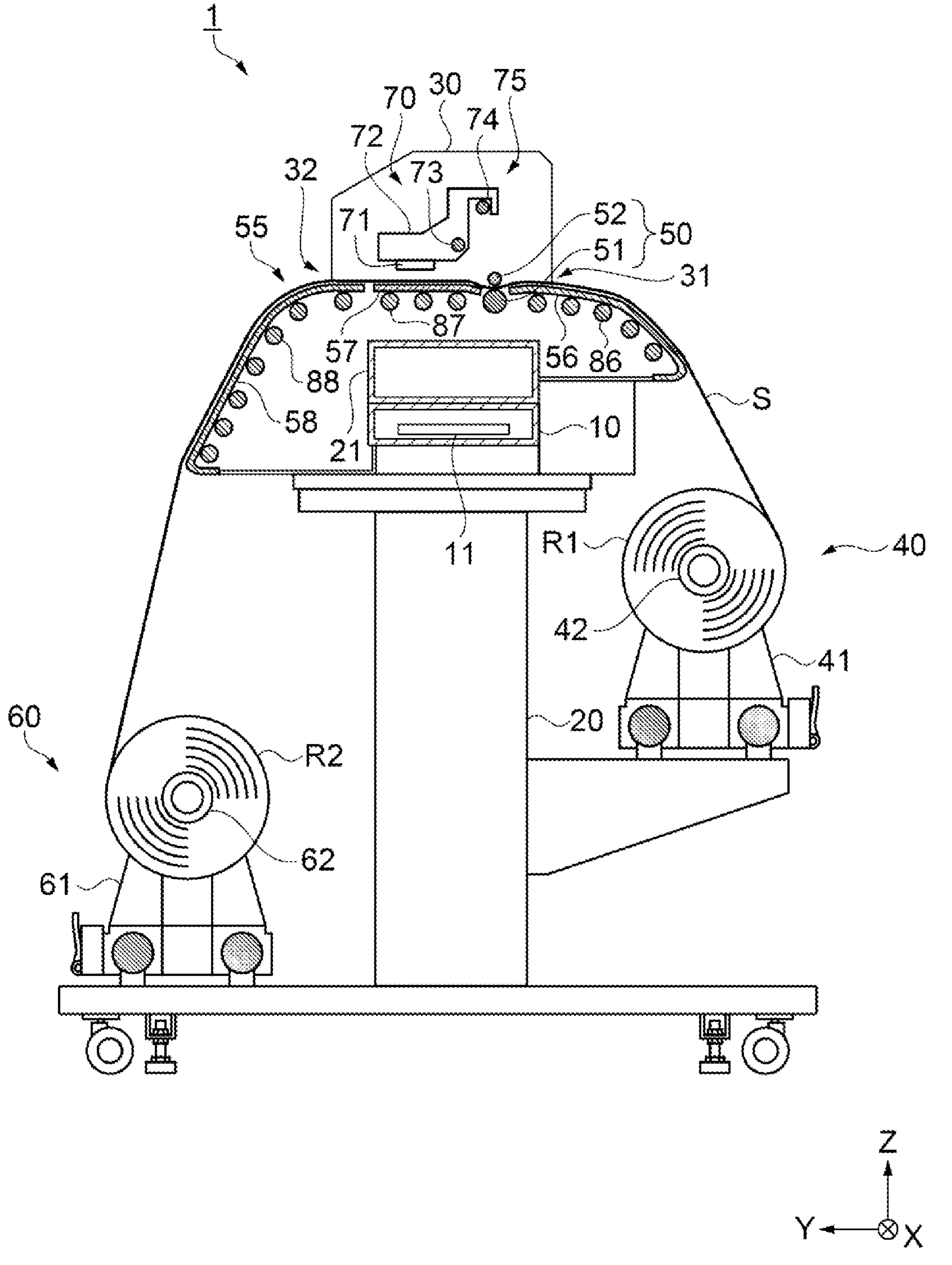
FIG. 2 is a cross-sectional view illustrating a schematic configuration of the printing apparatus.

As illustrated in FIG. 1 and FIG. 2, the printing apparatus 1 includes a supply unit 40, a transport unit 50, a guide unit 55, a winding unit 60, and the printing unit 70. The supply unit 40 and the winding unit 60 are provided to a pair of legs 20 separated from each other in the X direction being a first direction. The transport unit 50 and the guide unit 55 are supported on a base frame 21 bridged between the pair of legs 20. The printing unit 70 is provided inside a housing 30 having a substantially rectangular parallelepiped shape elongated in the X-axis. The housing 30 is above the transport unit 50 and the guide unit 55, and is supported on the base frame 21. A board box 10 that accommodates a control board 11 for controlling each unit of the printing apparatus 1 is arranged between the pair of legs 20 separated from each other under the base frame 21.

The supply unit 40 is provided behind and below the housing 30. A roll body R1 obtained by winding up an unused medium S about a core tube 42 is held in the supply unit 40. The supply unit 40 includes a pair of holders 41 for clipping both the ends of the core tube 42. One of the holders 41 is provided with a motor that supplies rotary power to the core tube 42. When the motor is driven to rotate the core tube 42, the medium S unwound from the roll body R1 is fed to the printing unit 70. Note that the roll body R1 multi-sized and formed with the medium S having a different width and the different number of times of winding is replaceably loaded to the supply unit 40.

The winding unit 60 is provided in front of and below the housing 30. A roll body R2 obtained by winding up, about a core tube 62, the medium S printed by the printing unit 70 is formed in the winding unit 60. The winding unit 60 includes a pair of holders 61 for clipping both the ends of the core tube 62. One of the holders 61 is provided with a motor that supplies rotary power to the core tube 62. When the motor is driven to rotate the core tube 62, the medium S is wound about the core tube 62. Note that the winding unit 60 may have a configuration of including a tension roller that presses a back surface of the medium S hanging down under its own weight and applies tension to the medium S wound about the core tube 62.

The guide unit 55 includes an upstream guide portion 56, a platen 57, and a downstream guide portion 58. The platen 57 has a plate-like shape elongated in the X-axis, and is provided at a position facing the printing unit 70. The platen 57 supports, from below, the medium S to be printed by the printing unit 70. The upstream guide portion 56 is provided upstream of the platen 57. Further, in the back surface of the housing 30, a supplying port 31 for supplying the medium S to the inside of the housing 30 is formed at a position on the upper side of the upstream guide portion 56. The upstream guide portion 56 guides the medium S, which is supplied from the supply unit 40, through the supplying port 31 to the platen 57. The downstream guide portion 58 is provided downstream of the platen 57. Further, in the front surface of the housing 30, a discharge port 32 for discharging the medium S to the outside of the housing 30 is provided at a position on the upper side of the downstream guide portion 58. The downstream guide portion 58 guides the medium S, which is printed by the printing unit 70, through the discharge port 32 to the winding unit 60.

The printing apparatus 1 includes a first heater 86, a second heater 87, and a third heater 88 that heat the medium S. The first heater 86, the second heater 87, and the third heater 88 are, for example, tube heaters, and are attached to the lower surfaces of the upstream guide portion 56, the platen 57, and the downstream guide portion 58 through intermediation of an aluminum tape or the like. The first heater 86 is a heater that heats the upstream guide portion 56, and thus gradually increases a temperature of the medium S supported on the upstream guide portion 56 from a room temperature to a target temperature. The second heater 87 is a heater that heats the platen 57, and thus maintains a temperature of the medium S on the platen 57 facing the printing unit 70 to the target temperature of 40 degrees Celsius. The third heater 88 is a heater that heats the downstream guide portion 58, and thus heats the medium S supported on the downstream guide portion 58 to a temperature of 50 degrees Celsius, which is higher than the target temperature. In this way, the ink ejected onto the medium S quickly dries and sets, and a high-quality image with little bleed-through and feathering is formed.

The transport unit 50 includes a driving roller 51 that is arranged under the medium S and is rotationally driven, a driven roller 52 that is arranged above the driving roller 51, and is rotated by following rotation of the driving roller 51, and a motor that supplies rotary power to the driving roller 51. The driving roller 51 extends in a direction intersecting the transport direction of the medium S, and is provided between the platen 57 and the upstream guide portion 56. The driven roller 52 is configured to be movable away from and pressed against the driving roller 51. When the motor is driven to rotationally drive the driving roller 51, the medium S sandwiched between the driven roller 52 and the driving roller 51 is transported in the transport direction.

The printing unit 70 is arranged above the arrangement position of the platen 57. The printing unit 70 includes a head 71 that ejects ink onto the medium S on the platen 57, a carriage 72 on which the head 71 is mounted, and a head moving unit 75 that moves the carriage 72 in the main scanning direction.

The head moving unit 75 moves the carriage 72 in the main scanning direction. The carriage 72 is configured in such a way as to be supported on guide rails 73 and 74 arranged along the X-axis and reciprocally movable in the main scanning direction by the head moving unit 75. For the mechanism of the head moving unit 75, for example, a mechanism including a combination of a ball screw and a ball nut, a linear guide mechanism, or the like may be employed. Further, the head moving unit 75 includes a motor being a power source for moving the carriage 72 along the X-axis direction. When the motor is driven, the head 71 reciprocally moves in the main scanning direction together with the carriage 72. When the head 71 ejects ink onto the medium S while moving in the main scanning direction, printing is performed.

At the upper right part of the housing 30, an operation unit 35 for performing a setting operation or an input operation is provided. At the lower right part of the housing 30, a container mounting unit 33 capable of mounting an ink accommodation container 34 is provided. Ink can be accommodated in the ink accommodation container 34. A plurality of accommodation containers 34 are mounted in the container mounting unit 33 in accordance with types and colors of ink. The ink accommodation container 34 and the head 71 are coupled to each other by a flexible tube, and thus ink is supplied to the head 71.

Figure 3:
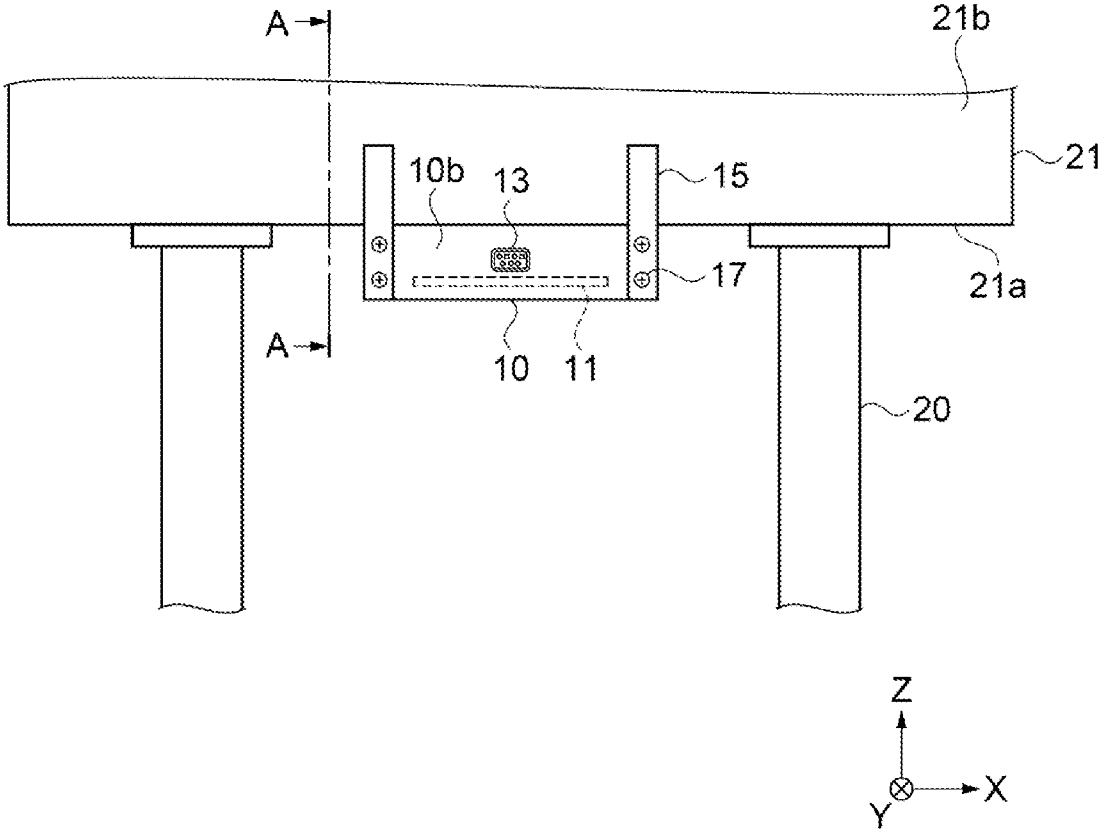
FIG. 3 is a back view illustrating a board box arranged under a base frame.
Figure 4:
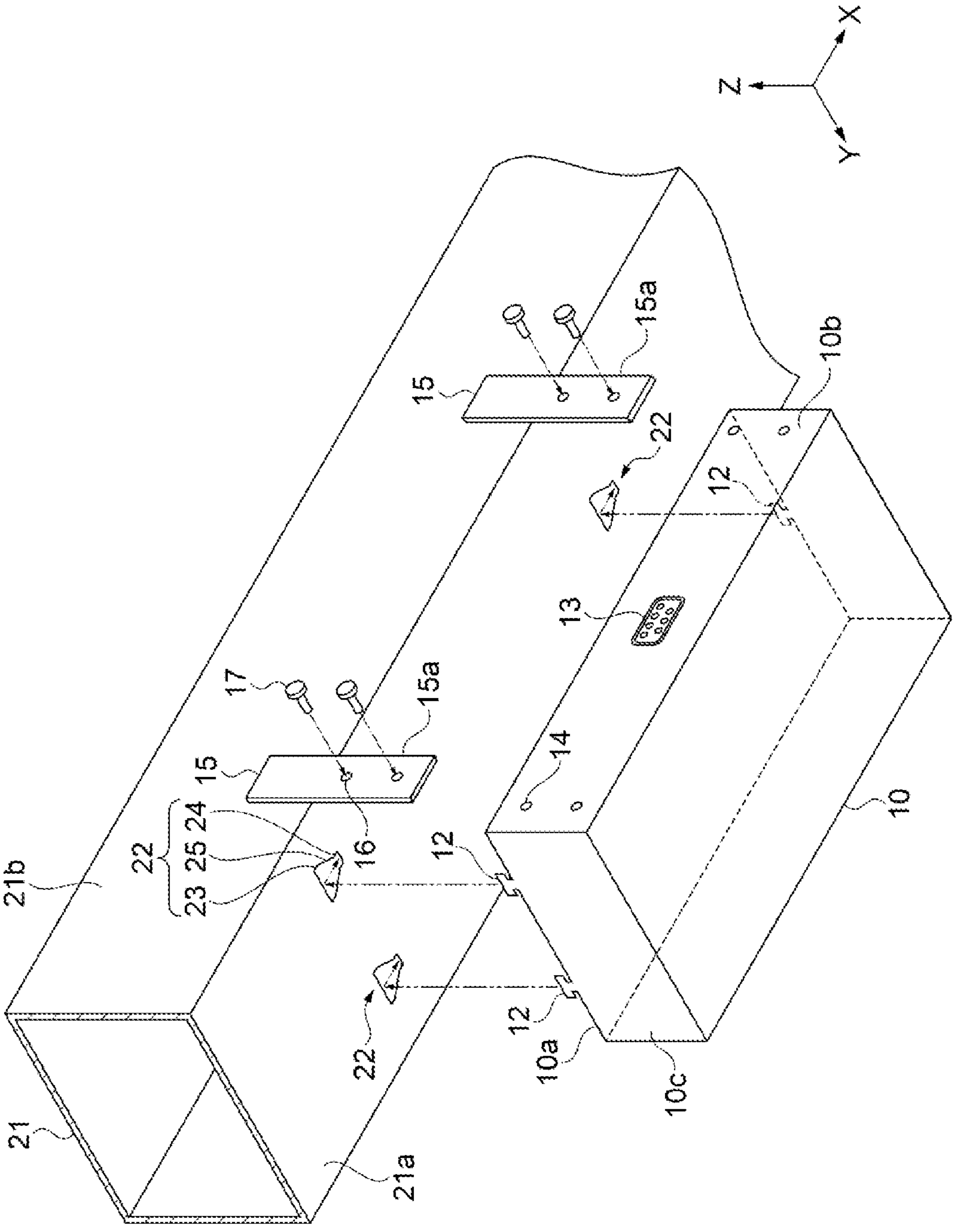
FIG. 4 is a cross-sectional perspective view taken along the line A-A of FIG. 3, and illustrates coupling between the base frame and the board box.
Figure 5:
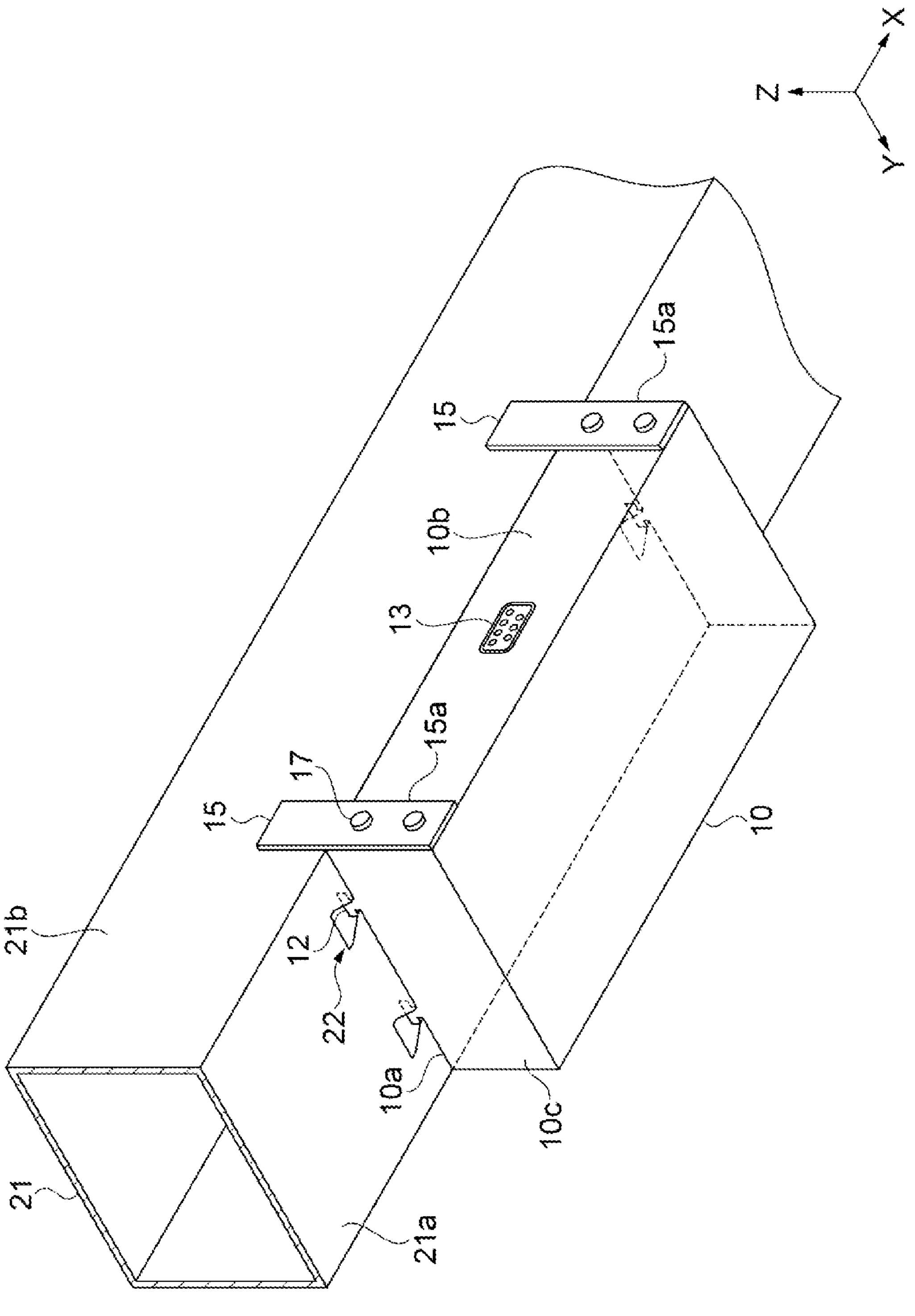
FIG. 5 is a cross-sectional perspective view taken along the line A-A of FIG. 3, and illustrates coupling between the base frame and the board box.

As illustrated in FIG. 3 to FIG. 5, the board box 10 is arranged under the base frame 21. The base frame 21 has a hollow rectangular parallelepiped shape elongated in the X direction, and is formed by sheet metal working such as an electro-galvanized steel plate. The board box 10 has a rectangular parallelepiped shape with a box structure having a width smaller than the width of the pair of legs 20 for supporting the base frame 21, and is formed of a metal material such as a steel plate, a stainless steel plate, and an aluminum plate. The board box 10 may have a structure without a lid body.

As illustrated in FIG. 4, a hook 12 is provided on an upper surface 10*a* of the board box 10, which is any one of a lower surface 21*a* of the base frame 21 and the upper surface 10*a* of the board box 10. Specifically, the hook 12 protrudes upward of the upper surface 10*a* from a side surface 10*c* formed in the Y-axis and the Z-axis. The hook 12 has a tip portion formed in a hammer head shape extending in the +Y direction and the −Y direction. Two hooks 12 protrude from both the ends of the side surface 10*c* of the facing side surfaces 10*c*, which is positioned in the −X direction, and one hook 12 protrudes from the center of the side surface 10*c* positioned in the +X direction. Note that the number of hooks 12 is merely one example, and it is only required that one or more hooks 12 be provided to each of the facing side surfaces 10*c*.

In the lower surface 21*a* of the base frame 21, which is the other surface, a hole 22 engageable with the hook 12 protruding from the upper surface 10*a* of the board box 10 is provided. The hole 22 has a wide portion 23, a narrow portion 24 having a width smaller than the width of the wide portion 23, and a groove portion 25 having a width reduced as approaching the narrow portion 24 from the wide portion 23. Specifically, the wide portion 23 has a width in the Y direction, which is larger than the width of the hammer-head tip portion of the hook 12. The narrow portion 24 is positioned in the X direction with respect to the wide portion 23, and has a width in the Y direction, which is smaller than the width of the hammer-head tip portion of the hook 12. The groove portion 25 extends in the X direction, and its width in the Y direction is reduced and increased.

The board box 10 abuts against the base frame 21 from below in such a way that, in plan view from the Z direction, the position of the hook 12 provided on the board box 10 and the position of the wide portion 23 of the hole 22 provided in the base frame 21 match with each other. With this, the hammer-head tip portion of the hook 12 enters the inside of the base frame 21 from the wide portion 23 of the hole 22, and protrudes.

Further, the board box 10 slides and moves in the +X direction. Along with this, the hook 12 moves from the wide portion 23 along the groove portion 25, and engages with the narrow portion 24. With this, the board box 10 is positioned at a predetermined position of the base frame 21. The hammer-head tip portion of the hook 12 has a width larger than the width of the narrow portion 24 of the hole 22, and hence the board box 10 is temporarily fixed to the base frame 21 in a suspended state. Note that, in the present exemplary embodiment, there is exemplified the hole 22 having a shape engaging the hook 12 at the narrow portion 24 by sliding and moving the board box 10 in the +X direction. However, there may be provided a hole having a shape engaging the hook 12 at a narrow portion by sliding and moving the board box 10 in the −X direction.

A female screw 14 is formed in a side surface 10*b* of the board box 10, which is any one of a side surface of 21*b* of the base frame 21 and a side surface 10*b* of the board box 10. The side surface 10*b* is a side surface that is parallel to the X direction and is formed in the X-axis and the Z-axis. The female screw 14 is provided in the side surface 10*b* of the facing side surfaces 10*b*, which is positioned in the −Y direction, that is, the side surface 10*b* provided on the rear side of the printing apparatus 1. The female screw 14 is formed by threading an inner circumference of a through hole passing through the side surface 10*b* of the board box 10 in the Y direction. Two female screws 14 are provided in the up-and-down direction on both ends of the side surface 10*b* of the board box 10 along the X direction.

On the side surface 21*b* of the base frame 21, which is the other surface, a fixing member 15 capable of abutting against the side surface 10*b* of the board box 10 having the female screw 14 formed therein is provided. The side surface 21*b* is a side surface that is parallel to the X direction and is formed in the X-axis and the Z-axis. The fixing member 15 is provided in the side surface of the facing side surfaces 21*b*, which is positioned in the −Y direction, that is, the side surface 21*b* provided on the rear side of the printing apparatus 1. The fixing member 15 has a plate-like shape elongated in the Z direction, and has a protruding portion 15*a* protruding downward of the base frame 21 in a state of being mounted to the side surface 21*b* of the base frame 21.

Under a temporarily fixing state in which the board box 10 is temporarily fixed at a predetermined position of the base frame 21, the fixing member 15 is provided at a position overlapping with both ends of the board box 10 in which the female screw 14 is formed. Specifically, in side view from the −Y direction under a temporarily fixing state, two fixing members 15 are provided at positions where the protruding portions 15*a* overlap with both the ends of the board box 10. The female screw 14 is covered with the protruding portion 15*a* of the fixing member 15. A method of mounting the fixing member 15 to the base frame 21 is not particularly limited, and mounting may be performed by screwing, riveting, welding, or the like.

Further, under a temporarily fixing state, the side surface 21*b* of the base frame 21 to which the fixing member 15 is mounted and the side surface 10*b* of the board box 10 in which the female screw 14 is formed are included in the same plane formed in the X-axis and the Z-axis. Further, the side surface 10*b* of the board box 10 in which the female screw 14 and a side surface of the protruding portion 15*a* of the fixing member 15 on the +Y side abut against each other.

A through hole 16 is provided in the fixing member 15. Under a temporarily fixing state, the through hole 16 communicate with the female screw 14 formed in the side surface 10*b* of the board box 10. The temporarily fixed board box 10 is fixed to the base frame 21 by a male screw 17 screwed into the female screw 14 through the through hole 16 of the fixing member 15. Note that, in the present exemplary embodiment, there is exemplified a configuration in which the two fixing member 15 overlapping with the ends of the board box 10 are provided. However, there may be adopted a configuration in which one fixing member overlaps the ends of the board box 10. Further, there may be adopted a configuration in which the fixing member is integrally formed with the base frame 21.

The board box 10 is provided with a relay connector 13 coupled to the control board 11. An opening for establishing electrical coupling with the control board 11 accommodated inside the board box 10 is formed in the side surface 10*b* of the board box 10. The relay connector 13 is a panel-lock type connector including a panel mounting mechanism. The relay connector 13 is inserted into the opening, and thus is fixed to the side surface 10*b* of the board box 10.

An internal terminal of the relay connector 13 is coupled to the control board 11. An external terminal of the relay connector 13 is connected to a connector conducted with each unit of the printing apparatus 1, which is controlled by an electrical signal output from the control board 11. Note that a plurality of relay connectors 13 may be provided. Further, the relay connector 13 may be provided to any surface except for the upper surface 10*a* of the board box 10.

Note that, in the present exemplary embodiment, there is exemplified the printing apparatus 1 having a configuration in which the hook 12 is provided to the upper surface 10*a* of the board box 10 and the hole 22 is provided in the lower surface 21*a* of the base frame 21. However, the printing apparatus may have a configuration in which the hook is provided to the lower surface 21*a* of the base frame 21 and the hole is provided in the upper surface 10*a* of the board box 10.

Further, in the present exemplary embodiment, there is exemplified the printing apparatus 1 having a configuration in which the female screw 14 is formed in the side surface 10*b* of the board box 10 and the fixing member 15 is provided to the side surface 21*b* of the base frame 21. However, the printing apparatus may have a configuration in which the fixing member is provided to the side surface 10*b* of the board box 10 and the female screw 14 is formed in the side surface 21*b* of the base frame 21. Further, there may be adopted a configuration in which the fixing member is integrally formed with the board box 10.

Further, in the present exemplary embodiment, there is exemplified a configuration in which one board box 10 is provided to the lower surface 21*a* of the base frame 21. However, there may be adopted a configuration in which a plurality of board boxes 10 are provided to the lower surface 21*a* of the base frame 21.

Note that, in the exemplary embodiment, there is exemplified the printing apparatus 1 of a serial-head type in which the head 71 is mounted on the reciprocally-movable carriage 72 and ejects ink while moving in the width direction of the medium S. However, the printing apparatus 1 may be a printing apparatus of a line-head type in which the head 71 extends, is fixed, and is arrayed in the width direction of the medium S.

As described above, the printing apparatus 1 according to the exemplary embodiment can provide the following advantages.

The printing apparatus 1 includes the base frame 21 that supports the printing unit 70 for performing printing on the medium S and the board box 10 that accommodates the control board 11. The hook 12 is provided to the upper surface 10*a* of the board box 10, and the hole 22 engageable with the hook 12 is provided in the lower surface 21*a* of the base frame 21. The female screw 14 is formed in the side surface 10*b* of the board box 10, and the fixing member 15 capable of abutting against the side surface 10*b* of the board box 10 is provided to the side surface 21*b* of the base frame 21.

When the hook 12 and the hole 22 are engaged with each other, the board box 10 is temporarily fixed to the base frame 21 in a suspended state. After that, the board box 10 is fixed to the base frame 21 by the male screw 17 screwed into the female screw 14 through intermediation of the fixing member 15. With this configuration, the space under the base frame 21 is advantageously utilized, and the board box 10 that accommodates the control board 11 can be provided in an easy mounting and removing manner.

The hole 22 has the wide portion 23, the narrow portion 24 having a width smaller than the width of the wide portion 23, and the groove portion 25 having a width reduced as approaching the narrow portion 24 from the wide portion 23. The hook 12 moves from the wide portion 23 along the groove portion 25, and engages with the narrow portion 24. With this, the board box 10 can be positioned easily at a predetermined position of the base frame 21.

The side surface 21*b* of the base frame 21 and the side surface 10*b* of the board box 10 are surfaces parallel to the X direction. The groove portion 25 extends in the X direction. The board box 10 slides along the groove portion 25 in the X direction, and thus is positioned at a predetermined position. The rotation causes the male screw 17 to advance in the Y direction intersecting with the X direction. Specifically, the board box 10 cannot move in the direction in which the male screw 17 advances, and hence the board box 10 can easily be fixed with a screw.

The side surface 21*b* of the base frame 21 and the side surface 10*b* of the board box 10 are surfaces parallel to the X direction. The fixing member 15 is provided at a position overlapping with both ends of the board box 10 in which the female screw 14 is formed. With this, when the board box 10 is mounted or removed, the board box 10 can be approached from a space between the pair of legs 20 separated from each other in the X direction, and hence workability is improved. Further, the fixing member 15 is provided at a position overlapping with both ends of the board box 10, and hence the board box 10 can efficiently be mounted on or removed from the base frame 21.

The side surface 21*b* of the base frame 21 and the side surface 10*b* of the board box 10 are included in the same plane. With this, when the hook 12 provided to the board box 10 is inserted into the hole 22 provided in the base frame 21, the positioning in the Y direction is facilitated. Thus, work efficiency of mounting the board box 10 is improved.

The board box 10 is provided with the relay connector 13 coupled to the control board 11. With this, after mounting the board box 10, electrical coupling can be easily established with the control board 11.

What is claimed is:

1. A printing apparatus, comprising:

a base frame bridged between a pair of legs that are separated away from each other in a first direction and configured to support a printing unit configured to perform printing on a medium; and a board box arranged under the base frame and configured to accommodate a control board, wherein a hook is provided to any one surface of a lower surface of the base frame and an upper surface of the board box, and a hole engageable with the hook is provided in the other surface, a female screw is formed in any one side surface of a side surface of the base frame and a side surface of the board box, and a fixing member configured to abut against the one side surface is provided to the other side surface, and the board box is fixed to the base frame by a male screw screwed into the female screw through the fixing member.

2. The printing apparatus according to claim 1, wherein the hole includes a wide portion, a narrow portion having a width smaller than a width of the wide portion, and a groove portion having a width reduced as approaching the narrow portion from the wide portion, and the hook is configured to engage with the narrow portion.

3. The printing apparatus according to claim 2, wherein the side surface of the base frame and the side surface of the board box are side surfaces parallel to the first direction, and the groove portion extends in the first direction.

4. The printing apparatus according to claim 3, wherein the hook is inserted into the hole at the wide portion, and is moved along the first direction inside the groove portion to engage with the narrow portion.

5. The printing apparatus according to claim 4, wherein the male screw is configured to be screwed into the female screw in a state in which the hook is engaged with the narrow portion.

6. The printing apparatus according to claim 1, wherein the side surface of the base frame and the side surface of the board box are surfaces parallel to the first direction, and the fixing member is provided to the side surface parallel to the first direction at a position overlapping with both ends of the board box.

7. The printing apparatus according to claim 1, wherein the side surface of the base frame and the side surface of the board box are included in the same plane.

8. The printing apparatus according to claim 1, wherein the board box is provided with a relay connector coupled to the control board.

* * * * *